Oct. 20, 1970 J. SZABO 3,535,649

ACTIVE FILTERS

Filed July 15, 1968 3 Sheets-Sheet 1

INVENTOR
JOHN SZABO

BY [signature]
PATENT AGENT

Oct. 20, 1970 J. SZABO 3,535,649

ACTIVE FILTERS

Filed July 15, 1968 3 Sheets-Sheet 2

INVENTOR.
JOHN SZABO
BY
PATENT AGENT

ACTIVE FILTERS

Filed July 15, 1968 3 Sheets-Sheet 3

INVENTOR
JOHN SZABO
BY
PATENT AGENT

United States Patent Office 3,535,649
Patented Oct. 20, 1970

3,535,649

ACTIVE FILTERS

John Szabo, Breslau, Ontario, Canada, assignor to Electrohome Limited, Kitchener, Ontario, Canada Filed July 15, 1968, Ser. No. 745,032
Int. Cl. H03f 3/04
U.S. Cl. 330—31 10 Claims

ABSTRACT OF THE DISCLOSURE

An active filter comprising an amplifying device and a twin T network is provided. Depending upon the arrangement of the twin T network the active filter can have high or low pass characteristics. In the low pass embodiment it is possible to achieve a flat response down to direct current with a roll-off of 24 db per octave, and the slope of the roll-off part of the response curve can be readily varied. Two or more such active filters can be connected in tandem to provide even a higher degree of attenuation.

Figure 1A:
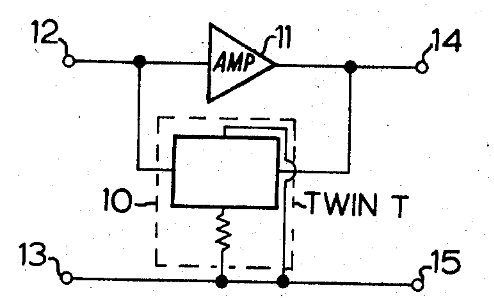
FIG. 1a (Prior Art)

This invention relates to active, as opposed to passive, filters. More particularly, this invention relates to active filters employing twin T networks for feedback between the output and input electrodes of the active elements of the filters and novel arrangements for injection of input signals into the filters and the take-off of output signals therefrom.

An active filter is one that employs an amplifying device such as a transistor in conjunction with passive elements. A passive filter, on the other hand, employs only passive electronic components (resistors, capacitors, inductance coils) and has no active element such as a transistor or electron discharge device.

The transmission characteristics of RC twin T networks are well known. Filters employing twin T networks commonly are used as band reject or bandpass filters.

It is known to combine an amplifier and a twin T network in circuits in which the twin T network either is in series with the signal input and output terminals of the circuit or is connected between the input and output electrodes of the amplifier as a feedback network. In such prior art circuits the input signal is passed either through the amplifier only or through both the amplifier and the twin T network. In either case the response of the amplifier and its associated circuit components, e.g. coupling and bypass networks, is an integral part of the response of the whole circuit, and, consequently, non-linearities (distortion) and noise are introduced in varying degrees. Furthermore, it is not possible to obtain, in the case of such circuits of which I am aware and that are low pass filters, an ideal flat response down to direct current or even low frequencies of the order of several Hz. Prior art active filters of the type hereinbefore mentioned are described in U.S. Pat. Nos. 3,193,774 issued July 6, 1965, G. L. Clapper for Frequency Selective Amplifier; 3,174,-111 issued Mar. 16, 1965, L. L. Grover for Twin-T Filter With Negative Feedback; and 2,495,511 issued Jan. 24, 1950, C. E. Dolberg for Twin-T Network and Selective Amplifier Filter.

In accordance with the instant invention there are provided active filters employing amplifiers and twin T networks in which the amplifiers are not located in the signal path between the input and output terminals of the circuit and do not introduce appreciable noise into or appreciable distortion of the signals applied to the circuits.

An important characteristic of an active filter embodying the invention is that it can have both a high and a variable rate of roll-off, so a high degree of attenuation of undesired frequencies is possible.

While filters embodying this invention may be of the low or high pass type, particular advantages are obtainable with low pass embodiments, namely that they can be designed with virtually no lower limit of roll-off frequency, and a flat response approaching direct current component can be achieved.

In accordance with a preferred embodiment of the instant invention there is provided a signal source and a filter having first and second output terminals between which a signal is derived. The filter also includes a twin T network that comprises a first T network having first, second and third legs and a second T network also having first, second and third legs. The filter additionally includes an amplifying device having an input electrode, an output electrode and a common electrode. A first network is connected between the first and second output terminals and comprises the third leg of the first T network and the third and first legs of the second T network connected in series with each other. A second network is connected between the two output terminals and comprises the second leg of the first T network and the second and first legs of the second T network connected in series with each other. A third network comprising the second and third legs of the second T network is connected between the input and output electrodes of the amplifying device. A fourth network comprising the second and third legs of the first T network also is connected between the input and output electrodes of the amplifying device. A fifth network is connected in parallel with both the first and second networks and between the two output terminals, the fifth network comprising the first leg of the first T network and the signal source connected in series with each other. A sixth network comprising the third leg of the first T network and the output and common electrodes of the amplifying device also is connected between the two output terminals.

Figure 1B:
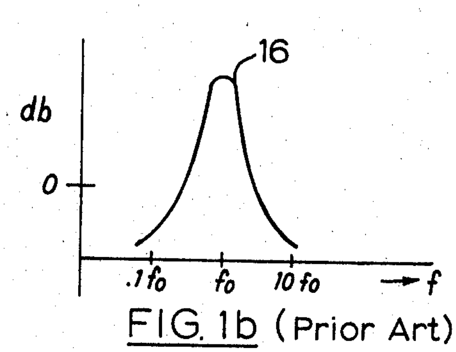
FIG. 1b (Prior Art)
Figure 2A:
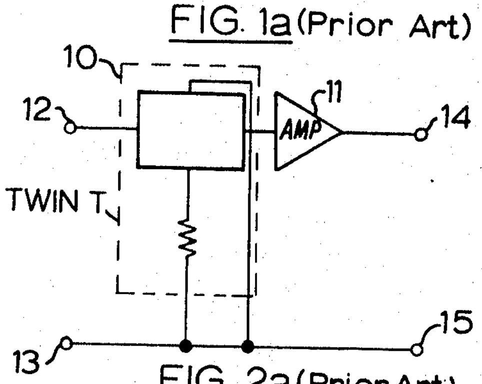
FIG. 2a (Prior Art)
Figure 2B:
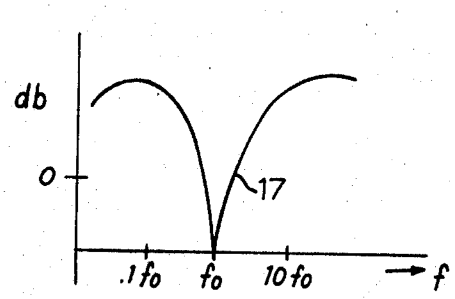
FIG. 2b (Prior Art)
Figure 3A:
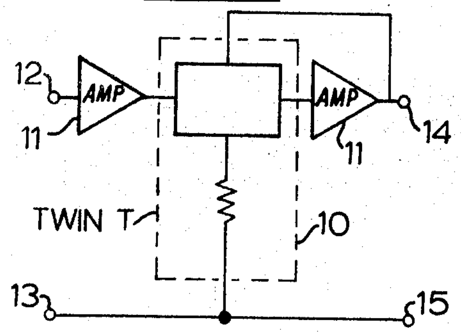
FIG. 3a (Prior Art)
Figure 3B:
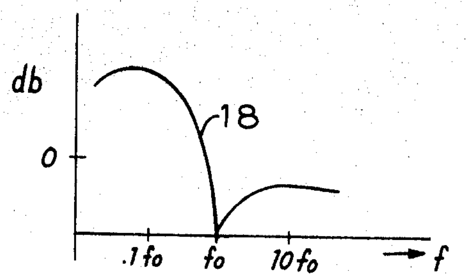
FIG. 3b (Prior Art)
Figure 4A:
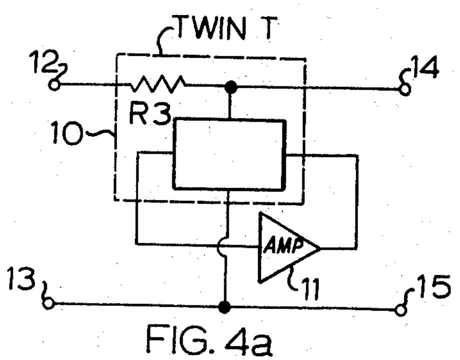
Figure 4B:
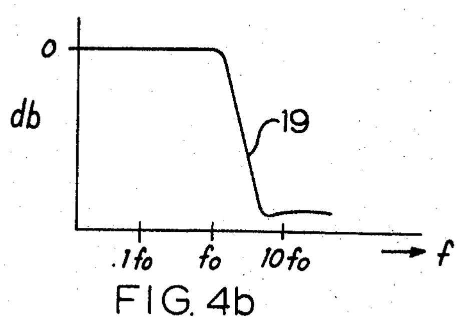
Figure 5A:
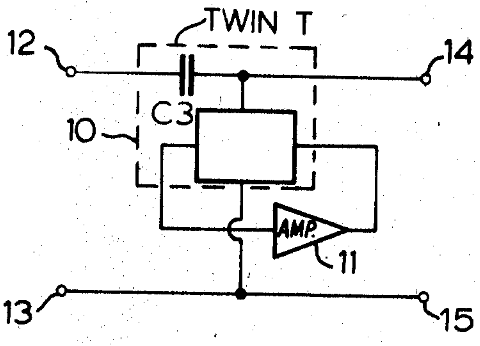
Figure 5B:
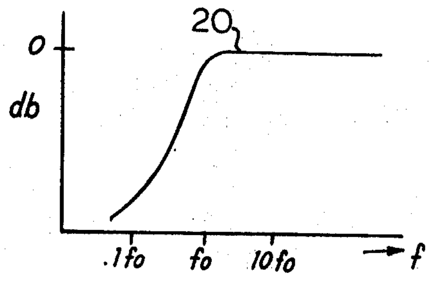
Figure 6:
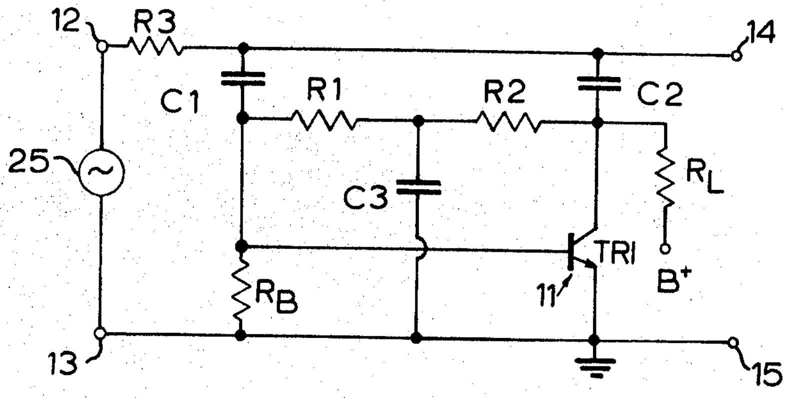
Figure 7:
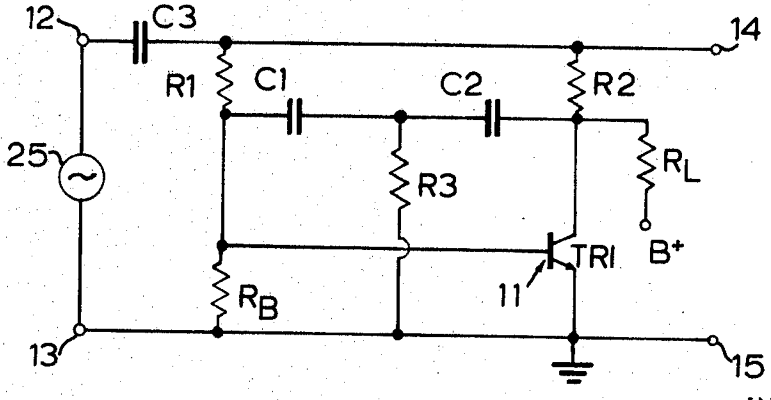
Figure 8:
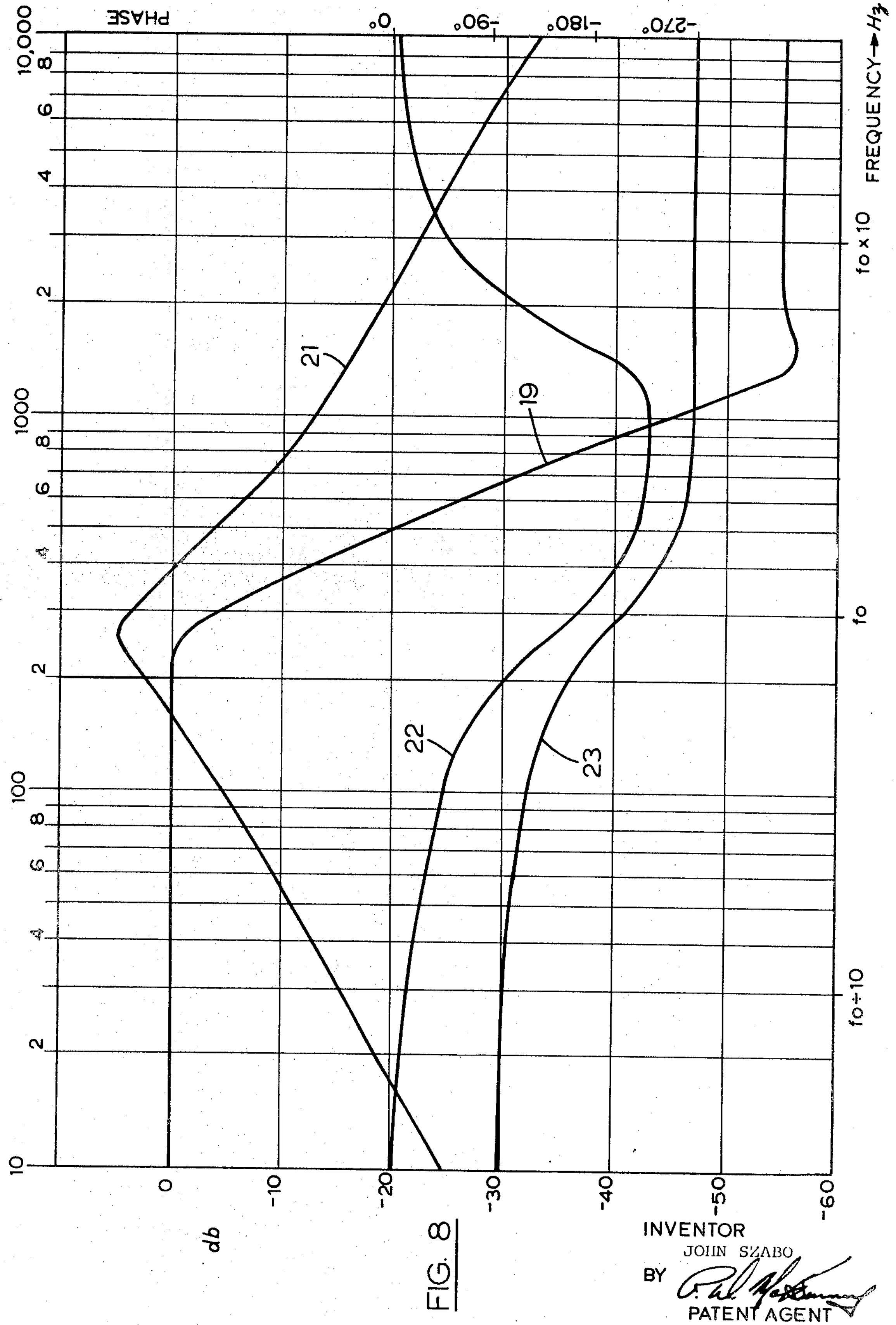

This invention will become more apparent from the following detailed description, taken in conjunction with the appended drawings in which:

FIGS. 1*a*, 2*a* and 3*a* are block diagrams of known active filters employing twin T networks and amplifying devices;

FIGS. 1*b*, 2*b* and 3*b* are graphs illustrating the responses of the filters shown in FIGS. 1*a*, 2*a* and 3*a* respectively, the graphs being a plot of gain in db against frequency;

FIGS. 4*a* and 5*a* are block diagrams of low and high pass active filters embodying the instant invention;

FIGS. 4*b* and 5*b* are graphs like FIGS. 1*b*–3*b* but showing the responses of the filters of FIGS. 4*a* and 5*a* respectively;

FIGS. 6 and 7 are diagrams showing the circuits of FIGS. 4*a* and 5*a* respectively in greater detail; and FIG. 8 graphically depicts various parameters of the circuit of FIG. 6.

Referring to FIGS. 1*a* to 5*a*, in each case the reference numeral 10 designates a conventional RC twin T network, while the reference numeral 11 designates an amplifying device. The solid rectangle within dotted line 10 constitutes a part of the twin T network. The filters shown in these figures all are four terminal networks having input terminals 12 and 13 between which a signal is applied and output terminals 14 and 15 between which a signal is derived.

FIG. 1*a* shows a bandpass filter or frequency selective amplifier of the type shown in aforementioned U.S. Pat. 2,495,511. The response curve 16 thereof is shown in FIG. 1*b*. It should be noted in connection with FIGS. 1*b* to 5*b* inclusive that the frequency scale is logarithmic, while the db scale is linear. The point marked $f_0$ is the resonant or null frequency of the twin T network. The point marked 0 on the db scale is a reference point corresponding to the input voltage.

The active filter of FIG. 2*a* is a band reject filter or frequency selective amplifier and has the response curve 17 shown in FIG. 2*b*.

FIG. 3*a* shows a low pass frequency selective amplifier with negative feedback of the type shown in aforementioned U.S. Pat. 3,174,111 and has the response curve designated 18 in FIG. 3*b*.

It may be seen by reference to FIGS. 1*a* to 3*a* that all of the prior art filters illustrated therein contain at least one amplifier 11 connected serially in the signal path between input terminal 12 and output terminal 14, the filters of FIGS. 2*a* and 3*a* also including twin T networks 10 in this signal path. Because of this, the filters of FIGS. 1*a* to 3*a* all produce output voltages greater than the input voltages applied thereto, as indicated by the portions of curves 16, 17 and 18 above the 0 db line. The response curves 17 and 18 of the filters of FIGS. 2*a* and 3*a* additionally both show a decrease in gain towards the left end of the frequency scale, i.e. at low frequencies, this being due to the presence of amplifiers 11 serially connected between terminals 12 and 14. Such a response is particularly undesirable in a low pass filter.

By way of comparison, active filters embodying this invention and shown in FIGS. 4*a* and 5*a* do not contain any amplifying device in the signal path between the input and output terminals of the filter. One leg of one of the T networks making up twin T network 10 is connected in the signal path between input terminal 12 and output terminal 14, this leg consisting of resistor R3 in FIG. 4*a* and capacitor C3 in FIG. 5*a*. The remainder of the twin T network is shunted between output terminals 14 and 15. Feedback is provided by connecting the input and output electrodes of amplifying device 11 via the twin T network.

The circuit of FIG. 4*a* is a low pass filter, and its response curve is shown at 19 in FIG. 4*b*. It is important to note that the response is linear down to direct current and does not fall off at low frequencies like response curves 17 and 18. Moreover, response curve 19 rolls off much more linearly than do response curves 17 and 18. It also will be seen that the characteristic frequency $f_0$ in FIG. 4*b* is at an entirely different point on the gain scale than are the characteristic frequencies $f_0$ in FIGS. 2*b* and 3*b*.

The circuit of FIG. 5*a* is a high pass filter and has the response curve 20 shown in FIG. 5*b*.

Referring to FIGS. 6 and 7, the filters shown therein have input terminals 12 and 13 and output terminals 14 and 15 and include a signal source 25, an amplifier device 11 in the form of a transistor TR1 and a conventional twin T network consisting of resistors R1, R2 and R3, and capacitors C1, C2 and C3. The collector electrode of transistor TR1 is connected via a load resistor $R_L$ to a positive D.C. potential (B+). $R_B$, a biasing resistor for transistor TR1, is provided.

The twin T network consists of two T sections each having three legs. One of the T sections consists of resistor R3 and capacitors C1 and C2. The other T section consists of capacitor C3 and resistors R1 and R2.

Referring specifically to FIG. 6, signal source 21 is connected between input terminals 12 and 13, while resistor R3 is connected between input terminal 12 and output terminal 14. Capacitor C2, resistor R2 and capacitor C3 are connected in series with each other between output terminals 14 and 15, while capacitor C1, resistor R1 and capacitor C3 also are connected in series with each other between the two output terminals, both of these latter series connected circuits being connected in parallel with a series circuit consisting of signal source 25 and resistor R3. The collector electrode of transistor TR1 is connected to the common terminal of capacitor C2 and resistor R2, while the emitter electrode of the transistor is connected to a terminal at a reference potential, namely ground potential and to output terminal 15. The base electrode of transistor TR1 is connected to the common terminal of capacitor C1 and resistor R1, and biasing resistor $R_B$ is connected between the base and emitter electrodes of the transistor. Resistors R1 and R2 constitute a path for feedback between the collector and emitter electrodes of transistor TR1 as do capacitors C1 and C2.

It should be noted that biasing resistor $R_B$ could be omitted if resistors R1 and R2 were chosen to provide proper bias for transistor TR1.

The circuit of FIG. 7 is identical to the circuit of FIG. 6 except for the connection of the twin T network. In the circuit of FIG. 7 the twin T network is arranged so that capacitor C3 is connected in the signal path between input terminal 12 and output terminal 14, other changes in the connections of the components of the twin T network being obvious from a comparison of FIGS. 6 and 7.

Turning now to FIG. 8, curve 19 shown therein corresponds to response curve 19 of FIG. 4*b*. Curve 21 is the voltage measured at the collector electrode of transistor TR1 in the circuit of FIG. 6. Curves 22 and 23 show the phase angles for the circuit of FIG. 6 of the voltages at terminal 14 and the collector electrode of transistor TR1 respectively. All curves are drawn for the conditions $R1=R2=R3$, $C1=C2$, and $C3=C1+C2$. Under these conditions the characteristic frequency $f_0$ equals $$1/2\pi R3C1$$

The characteristic frequency may be increased by increasing the value of resistor R3 or capacitor C1 or both and decreased by decreasing the value of resistor R3 or capacitor C1 or both. The foregoing conditions are not essential to the invention, but deviation therefrom will result in variations of the curves shown in FIG. 8. Thus, if the other conditions are maintained but capacitor C3 is made smaller than indicated above, the frequency $f_0$ will increase and the roll-off slope of curve 19 will become less steep. On the other hand, if capacitor C3 is made larger or resistor R3 is made smaller than indicated above, a peak will occur in the response curve at $f_0$ and eventually oscillation will result as the value of capacitor C3 is increased or the value of resistor R3 is decreased. If capacitor C3 is removed entirely, thereby providing an open circuit bewteen the common terminal of resistors R1 and R2 of FIG. 6 and ground, response curve 19 will roll-off at 12 db per octave instead of at 24 db per octave as shown in FIG. 8. Thus, in another embodiment of this invention the leg of the T network consisting of resistors R1 and R2 and capacitor C3 that contains capacitor C3 can be eliminated and a single resistor substituted for resistors R1 and R2. When this is done, a twin T network no longer is being used, of course. The fact that the slope of the roll-off part of curve 19 can be varied is an important feature of the invention, since the roll-off slope of curve 19 may be varied by varying the value of capacitor C3. With the circuit of FIG. 6, this means that it is possible to obtain a variable rate of attenuation of frequencies above frequency $f_0$. The high rate of attenuation, i.e. 24 db per octave, that can be obtained with an active filter embodying this invention also is of importance.

With reference to FIG. 7, with $R1=R2=R3$, $C1=2$ and $C3=C1+C2$ the characteristic frequency $f_0$ equals $1/2\pi R3C1$ and may be increased or decreased by changing the value of resistor R3 or capacitor C1 or both. The slope of the roll-off part of curve 20 can be varied by varying the value of resistor R3 and the leg containing resistor R3 can be eliminated and a single capacitor substituted for capacitors C1 and C2.

The operation of the active filter of FIG. 6 can best be explained by reference to both FIG. 6 and FIG. 8. At frequencies that are much below $f_0$, i.e. $0.1f_0$, the impedances of capacitors C1 and C2 will be high, while the input impedance of transistor TR1 is small, so the signal applied to the base electrode of transistor TR1 from signal source 25 will be small. Moreover, as is characteristic of twin T networks, the impedance of the feedback network will be low, so there will be a high degree of negative feedback and the gain of transistor TR1 will be low. Thus the voltage that will appear between output terminals 14 and 15 will be essentially the voltage produced by signal source 25. As the frequency of the signal applied between input terminals 12 and 13 approaches $f_0$, the impedances of capacitor C1 and C2 will decrease substantially thereby increasing the strength of the signal applied to the base electrode of transistor TR1, while the impedance of the feedback network will increase, as is characteristic of twin T networks, thereby decreasing the degree of negative feedback, so that the gain of transistor TR1 will increase and is at a maximum at $f_0$ as shown by curve 21 of FIG. 8. As shown by curve 23 of FIG. 8, the phase of the collector voltage of transistor TR1 passes through 180° at $f_0$. The voltage that will appear between terminals 14 and 15 at frequency $f_0$ is the same as the voltage that appears between these terminals at $0.1f_0$, but this voltage is essentially the voltage of transistor TR1 and is at a phase angle of 140° as shown by curve 22 of FIG. 8.

As the frequency of the signal applied between terminals 12 and 13 is increased above $f_0$ the impedance of the feedback network will decrease reducing the gain of transistor TR1 as shown by curve 21. Because of the increasing degree of negative feedback, the collector and base impedances of transistor TR1 will be reduced to low values, thereby virtually grounding capacitors C1 and C2 and providing an RC low pass network consisting of resistor R3 in the series leg and capacitors C1 and C2 in parallel to ground. The voltage response of this low pass network falls at about 6 db per octave. The combined action of the low pass network and the transistor results in a slope that falls off at 24 db per octave and reaches a minimum point at about $6f_0$ as shown by curve 19 of FIG. 8. At frequencies higher than about $6f_0$ the phase difference between the voltage at the collector electrode of transistor TR1 (about 270°) and of the RC low pass network (about 90°) is about 180°, so the out-of-phase voltages will cancel each other and the output voltage of the network will be kept low above the frequency $6f_0$ as shown by curve 19.

The operation of the filter of FIG. 7 is essentially the reverse of the operation of the filter of FIG. 6, as may be seen by comparing curves 19 and 20 of FIGS. 4*b* and 5*b*.

Merely by way of illustration, the following components may be utilized in a filter of the type shown in FIG. 6 and were utilized to obtain the various curves shown in FIG. 8:

$R1=R2=R3=22$K ohms
$R_L=10$K ohms
$R_B=5.6$K ohms
$C1=C2=.025$ mfd.
$C3=.05$ mfd.
$H_{FE}$ of transistor TR1=100

(All above components±10% tolerance).

It should be noted that an even greater rate of attenuation than that shown by curve 19 of FIG. 8 can be obtained by connecting two or more filters of the type shown in FIG. 6 in tandem resulting in twice or more the rate of slope shown by curve 19.

It should be noted that the previous discussion in connection with the circuit of FIG. 6 assumes that signal source 25 has zero internal impedance and that there is no load between output terminals 14 and 15. In practice signal source 25 will have some internal resistance and there will be a finite load impedance between terminals 14 and 15. This must be taken into consideration when choosing the value of resistor R3. As far as the circuit of FIG. 7 is concerned, the formula for $f_0$ assumes that signal source 25 has a low impedance compared to the impedance of capacitor C3 and that open circuit conditions apply. Signal source and load impedances must be considered when soliciting capacitor C3.

It would be possible to substitute an electron discharge device for transistor TR1, but this is not a preferred embodiment of the invention. Thus, a low pass filter so constructed would have to use a blocking capacitor to prevent B+ from being applied to its base electrode and would not have as good a response at low frequencies as the embodiment of FIG. 6.

Of course transistor TR1 could be a PNP transistor and connected via $R_L$ to B−.

What I claim as my invention is:

1. In combination, a signal source and a filter having first and second output terminals between which a signal is derived; said filter also including a twin T network comprising a first T network having first, second and third legs and a second T network having first, second and third legs; and an amplifying device having an input electrode, an output electrode and a common electrode; said third leg of said first T network and said third and first legs of said second T network being connected in series with each other between said terminals in a first network; said second leg of said first T network and said second and first legs of said second T network being connected in series with each other between said terminals in a second network; said second and third legs of said second T network being connected in series with each other between said input and output electrodes; said second and third legs of said first T network being connected in series with each other between said input and output electrodes; said first, second and third legs of said first T network having a common terminal connected to one of said output terminals said first leg of said first T network and said signal source being connected in series with each other between said terminals in a third network, said third network being connected in parallel with both said first and second networks; said third leg of said first T network and said output and common electrodes being connected in series with each other between said terminals in a fourth network, said fourth network being connected in parallel with said second and third networks.

2. The invention according to claim 1 wherein said second and third legs of said first T network and said first leg of said second T network each contain a capacitor and wherein said second and third legs of said second T network and said first leg of said first T network each contain a resistor.

3. The invention according to claim 1 wherein said second and third legs of said first T network and said first leg of said second T network each contain a resistor and wherein said second and third legs of said second T network and said first leg of said first T network each contain a capacitor.

4. The invention according to claim 1 wherein said amplifying device is a transistor.

5. The invention according to claim 4 wherein said transistor has base, collector and emitter electrodes, said input electrode being said base electrode, said collector electrode being said output electrode, said emitter electrode being said common electrode.

6. The invention according to claim 2 wherein said amplifying device is a transistor.

7. The invention according to claim 6 wherein said transistor has base, collector and emitter electrodes, said input electrode being said base electrode, said collector electrode being said output electrode, said emitter electrode being said common electrode.

8. The invention according to claim 6 wherein said resistors are of equal resistance, said capacitors in said second and third legs of said first T network are of equal capacitance and the sum of the capacitances of said capacitors in said second and third legs of said first T network equals the capacitance of said capacitor in said first leg of said second T network.

9. In combination, a signal source and a filter having first and second output terminals between which a signal is derived; said filter also including a T network having first, second and third legs containing a first resistor, a first capacitor and a second capacitor respectively; at least one second resistor; and an amplifying device having an input electrode, an output electrode and a common electrode; said second capacitor and said output and common electrodes being connected in series with each other between said terminals in a first network; said first resistor and said signal source being connected in series with each other between said terminals in a second network, said second network being connected in parallel with said first network; said first and second capacitors being connected in series with each other between said input and output electrodes; said first, second and third legs of said T network having a common terminal connected to one of said output terminals; and said second resistor being connected between said input and output electrodes.

10. In combination, a signal source and a filter having first and second output terminals between which a signal is derived; said filter also including a T network having first, second and third legs containing a first capacitor, a first resistor and a second resistor respectively; at least one second capacitor; and an amplifying device having an input electrode, an output electrode and a common electrode; said second resistor and said output and common electrodes being connected in series with each other between said terminals in a first network; said first capacitor and said signal source being connected in series with each other between said terminals in a second network, said second network being connected in parallel with said first network; said first and second resistors being connected in series with each other between said input and output electrodes; said first, second and third legs of said T network having a common terminal connected to one of said output terminals; and said second capacitor being connected between said input and output electrodes.

References Cited

UNITED STATES PATENTS 2,606,966 8/1952 Pawley ______________ 333—70

JOHN KOMINSKI, Primary Examiner

U.S. Cl. X.R.

330—176; 333—75